Feb. 3, 1970 G. H. HILAL ET AL 3,493,729

TIMING SYSTEM

Filed July 22, 1965 5 Sheets-Sheet 1

INVENTORS
JAMES L. MILLER &
GEORGE H. HILAL
BY John V. Regan
Attorney

INVENTORS
JAMES L. MILLER &
GEORGE H. HILAL
BY John V. Regan
ATTORNEY

Feb. 3, 1970 G. H. HILAL ET AL 3,493,729

TIMING SYSTEM

Filed July 22, 1965 5 Sheets-Sheet 3

INVENTORS
JAMES L. MILLER &
GEORGE H. HILAL
BY John V. Regan
Attorney

INVENTORS
JAMES L. MILLER &
GEORGE H. HILAL
BY John V. Regan
Attorney

INVENTORS
JAMES L. MILLER &
GEORGE H. HILAL
BY John V. Regan
Attorney

United States Patent Office 3,493,729
Patented Feb. 3, 1970

3,493,729
TIMING SYSTEM

George H. Hilal, Lebanon, and James L. Miller, Haddonfield, N.J., assignors to RCA Corporation, a corporation of Delaware Filed July 22, 1965, Ser. No. 474,056
Int. Cl. G06k 7/00
U.S. Cl. 235—61.11 8 Claims

ABSTRACT OF THE DISCLOSURE

A document reader in which a source of timing signals is operated in synchronism with a document transport. The timing signals are applied to a counter, and selected count outputs are used to time the operation of the reader and associated receiver equipment. The counter is set to a reference count each time acceptable data is sensed on a document line. An error condition is signaled if a data bearing line does not arrive at the reading elements when the count stored in the counter is betwen two specified limits, which limits establish the system tolerance.

In information handling systems, information may be recorded on documents in the form of printed characters, meaningful patterns of perforations, recorded spots or marks, etc. In one known type of record card, for example, there are twelve rows and eighty columns of index point or data storage positions. Information is recorded by perforating the card at desired index point positions. Recorded information is retrieved by passing the card through a reader having a line of sensing elements in number and position corresponding to the number and position of data storage positions within a card row or column, depending upon whether the card is to be read row-by-row or column-by-column.

Most card and other document readers are designed for use with a larger information handling system. It is necessary that synchronizaiton be maintained between the reader and the receiving equipment in order that no misinterpretation of data shall occur. This generally is accomplished by providing timing or control signals to the receiver equipment from the reader. Many prior art systems derive the timing signals from a generator, such as a timing disk, which is mechanically coupled to the document feed means and driven in synchronism therewith.

One disadvantage of such a timing arrangement is that the generation of timing signals is not dependent directly upon the locations of the lines of recorded data relative to the sensing elements. For example, any slippage of the card or backlash in the driving mechanism may result in a loss of synchronism between the movement of the card and the operation of the pulse generator, whereby a timing signal may be generated when the sensing elements are not sensing data. This results in a loss of information. Further, the recorded data or perforations may not be located exactly at the index point positions on the document. In fact, there may be punching tolerances, which become cumulative throughout the document so that a timing signal may be generated before or after a line of data is presented at the read station.

It is one object of this invention to provide an improved timing arrangement for use in a document handling system.

It is another object of this invention to provide an improved timing system wherein the timing is synchronized with the locations of the recorded data.

It is still another object of this invention to provide a timing arrangement for a document reader, wherein the system timing is resynchronized each time a line of recorded data is presented to the sensing elements.

A further object of this invention is to provide a timing arrangement for a document reader, wherein any line of recorded data is either accepted or rejected in dependence upon its arrival at the reader within or without, respectively, of a given time period, or multiple thereof, following the last preceding line of data presented to the sensing elements.

Briefly stated, the invention includes a source of timing signals operated in synchronism with the document transport means. These signals are applied to a counter, and certain outputs of the counter corresponding to selected counts are employed to time the operation of the reader apparatus and receiver equipment. The counter is set to a reference count in response to the sensing of each different line containing recorded data. An error condition is signaled if the following data bearing line does not arrive at the sensing elements when the count stored in the counter is between two specified limits, which limits are chosen to establish the tolerance acceptable in the system.

In the accompanying drawing, like reference characters denote like components, and:

Figure 1:
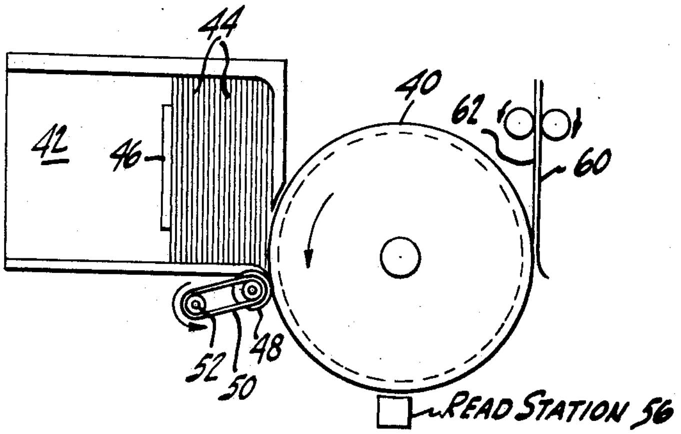
FIGURE 1 is a plan view of a document handling system.

Although the invention to be described is not restricted to use in a system for reading perforated record cards, the system will be described for illustrative purposes as being incorporated in a perforated card reader system. The reader system may include a vacuum drum 40 (FIGURE 1) located adjacent to one end of an input hopper 42 in which perforated record cards 44 are stacked on edge. The cards are biased toward the front of the hopper and adjacent the drum 40 by a backing plate 46. In addition, there may be a solenoid actuated gate or arm (not shown) at the front of the hopper for either allowing the forwardmost document to contact the drum 40 or biasing the document away from the drum, depending upon the operating state of the solenoid. Such an arrangement is illustrated, for example, in the copending application of Carl G. Fraidenburg et al., Ser. No. 214,061, filed Aug. 1, 1962 for "Document Handling Apparatus," and assigned to the same assignee as the instant invention. In addition, the system may include a separator wheel 48 located at the mouth or throat of the hopper and driven by a belt 50 from a drive wheel 52. The purpose of the separator wheel 48 is to apply a frictional force on the document in a direction opposite that provided by the vacuum drum 40 to prevent the feeding of more than one document at a time.

Figure 2:
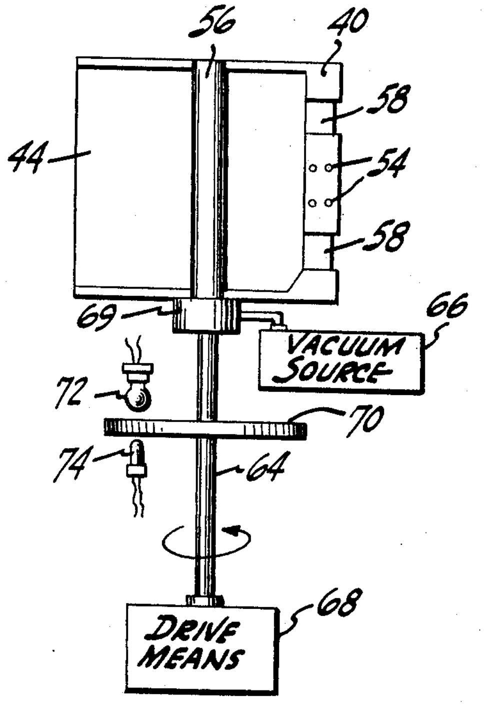
FIGURE 2 is a view in elevation of a document transport drum, read station and timing disk.

As shown in FIGURE 2, drum 40 has one or more circumferential bands of apertures 54 through which a vacuum is applied to pick up a document 44 from the hopper 42 and to transport the document past a read station 56. In addition, drum 44 may have a pair of grooves 58. In FIGURE 1, the documents which are fed past the read station 56 are stripped off the drum and fed along a channel defined by upstanding guide members 60, 62 to an output hopper (not shown). The end of the upstanding member 62 nearest the drum 40 may include a pair of curved fingers which fit within the grooves 58 of the drum to strip the document off the drum.

Drum 40 is rotated by means of a shaft 64 which extends through a bearing housing and vacuum input assembly, represented by box 69. The internal mechanism of this assembly may be of the general type described and illustrated in the copending application aforementioned. A vacuum source 66 is coupled to the drum 40 by way of the assembly 69. Shaft 64 is rotated by a drive means 68 which may be, for example, a motor operatively coupled to the shaft by means of gears, belts or the like. A timing disk 70 is mounted on shaft 64 and rotated in synchronism therewith. Disk 70 may be of known type having a circumferential row of apertures evenly spaced from one another. A signal is generated each time an aperture in the disk 70 passes between a light source 72 and a photo-pickup device. 74.

Read station 56 includes a plurality of sensing elements in number and location corresponding to the number and location of index point positions in a line of the document. For example, if the record cards 44 are ones having twelve rows and eighty columns of index point positions, and if the cards are fed in a direction normal to the card columns, then the read station includes twelve sensing elements located to sense a column of information at a time. Read station 56 also may include an additional sensing element for detecting the presence of a card at the read station. When the sensing elements are photo-detector devices, read station 56 also may include a source of light. In one known optical card reader system, the document being transported by the drum is stripped off the drum 40 at a point slightly preceding the read station, fed through the read station, and then directed back to the drum 40. In that case, the light source may be located on one side of the document feed path through the read station and the light sensitive elements may be located on the opposite side of the feed path, whereby the document moves between the light source and the light sensitive elements.

Figure 3:
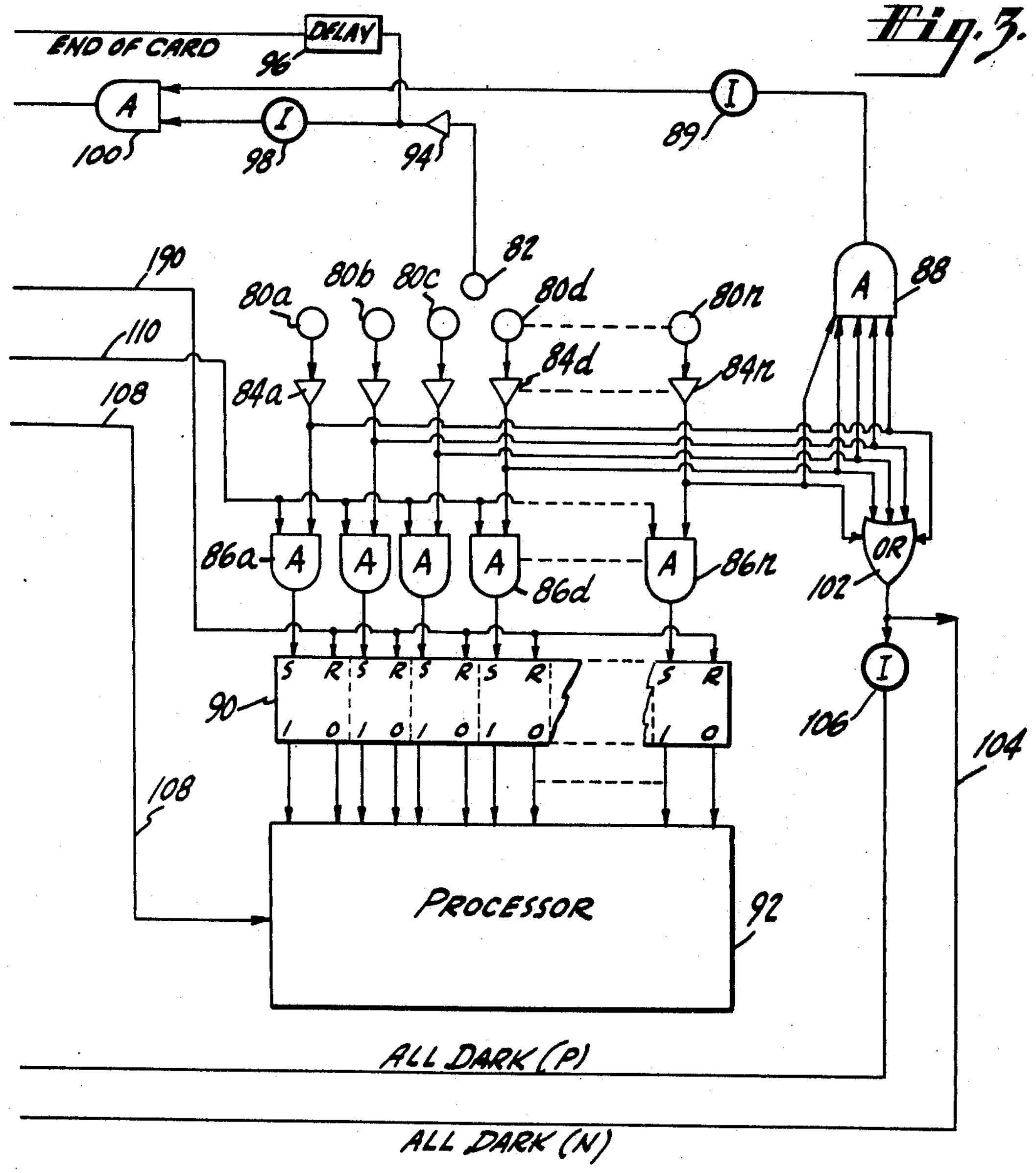
FIGURE 3 is a diagram of the read head and its associated logic.
Figure 5:
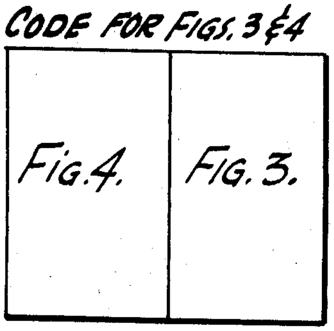
FIGURE 5 is a diagram showing the relationship of FIGURES 3 and 4.

Several of the light sensitive reading elements are illustrated symbolically in FIGURE 3 and may be identified by the reference characters 80*a* . . . 80*n*. The dashed line between elements 80*d* and 80*n* in FIGURE 3 indicates that there are other intervening elements of like type which are not illustrated. As mentioned previously, there are twelve light sensitive elements for sensing perforations when the record card is to be read column-by-column. An additional light sensitive element 82 is provided for detecting the presence of a card at the read station.

The output of each of the light sensitive reading elements 80*a* . . . 80*n* is applied to a separate amplifier 84*a* . . . 84*n*, respectively, and the output of each of the amplifiers 84*a* . . . 84*n* is applied (1) as one input to a different AND gate 86*a* . . . 86*n*, (2) to an OR gate 102, and (3) to a common AND gate 88. The output of gate 88 is inverted in a circuit 89. The amplifiers may be of the type which provides a relatively high output signal when the associated light sensitive element is receiving light, and which provides a relatively low output when the light sensitive element is dark. A second input to each of the gates 86*a* . . . 86*n* is a timing or control signal to be described hereinafter. In order to staticize the outputs from the photo-sensitive elements 80*a* . . . 80*n* and to provide short term interim storage, the outputs of the AND gates 86*a* . . . 86*n* are supplied to the set (S) input terminals of separate flip-flops in a register 90. The flip-flop stages are reset periodically by means of a control pulse to be described. All of the outputs of the register 90 are applied to an information handling system 92, designated "processor," which may be, for example, a decoder or a digital computer.

Figure 4:
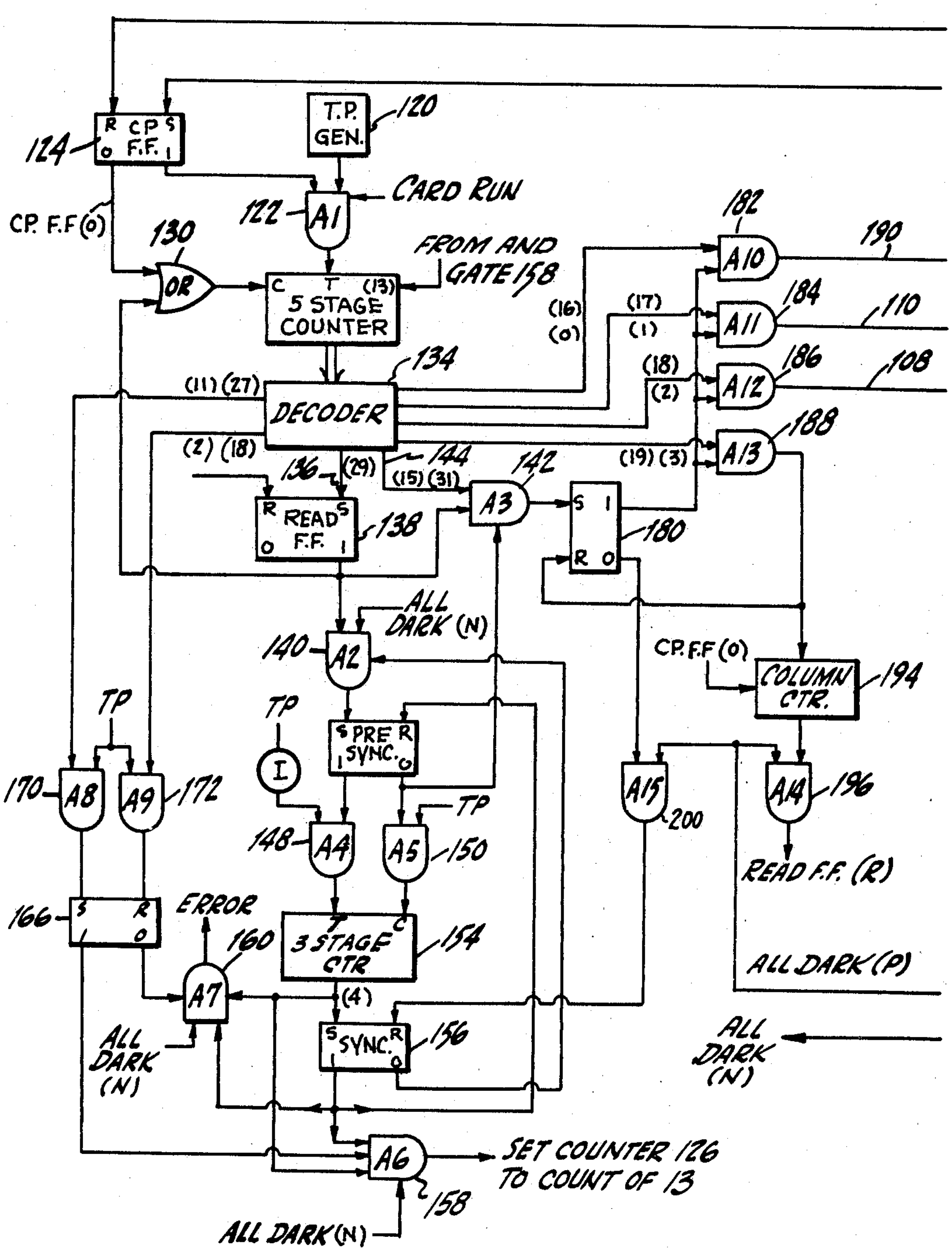
FIGURE 4 is a logic diagram of the timing arrangement.

The output of the card detecting photo-sensitive element 82 is applied to an amplifier 94. Amplifier 94 has its output coupled to the input of a delay device 96 and to the input of an inverter 98. The output of inverter 98 is coupled to one input of an AND gate 100, the second input to which is the output of inverter 89. In the operation of the FIGURE 3 arrangement, the card detecting photosensitive element 82 goes dark when a card is fed into the read station. The output of amplifier 94 then changes from a high to a low condition. This output is inverted and applied as a high input to AND gate 100. The second input to this gate is low until one of the reading elements 80*a* . . . 80*n* goes dark, whereupon the output of AND gate 88 goes low and the output of inverter 89 goes high. When both inputs to AND gate 100 are high, output of the gate goes high and sets a card present (CP) flip-flop 124 (FIGURE 4).

When the first card column containing perforations is present at the read station, one or more of the data sensing elements 80*a* . . . 80*n* receive light, and the outputs of the associated amplifiers 84*a* . . . 84*n* go high. These high outputs pass through OR gate 102 to provide a high level signal on output line 104. The level on line 104 is designated "ALL DARK (N)," and is high when a perforation is being sensed at the read station and is low when no perforation is being sensed. The output of OR gate 102 also is inverted in a device 106. The output of inverter 106 is designated "ALL DARK (P)." This output is high in the absence of a sensed perforation, and is low when a perforation is being sensed.

The high outputs of those amplifiers 84*a* . . . 84*n* associated with the light receiving photo-sensitive elements prime one input of the associated AND gates 86*a* . . . 86*n*. Upon the receipt of a control signal applied to line 110, those AND gates 86*a* . . . 86*n* become fully enabled, whereby the information detected from the card is gated to the register 90. A signal is sent to the processor 92 over a line 108 to synchronize the processor with the card reader. Register 90 is reset by a control signal applied over line 190.

When the trailing edge of the card passes the card detecting photo-sensor 82, the output of amplifier 94 goes high. This high output is delayed and resets the CP flip-flop 124 (FIGURE 4).

FIGURE 4 is a logic diagram of the timing arrangement for the card reader system and processor. The arrangement includes a timing pulse generator 120. This generator may include the timing disk 70 and photo-pickup device 74 of FIGURE 2. Timing generator 120 has its output applied to one input of a first AND gate 122. A second input to this gate is a level "CARD RUN," which is high when cards are being processed. A third input to this gate as the (1) output of card present flip-flop 124. Flip-flop 124 becomes set by the output of AND gate 100 (FIGURE 3), as described previously. The flip-flop is of the type which provides a high output at the (1) terminal when the flip-flop is set. Accordingly, timing pulses 120 pass through the AND gate 122, whenever a card is present at the reader. These pulses are applied to the trigger terminal of a counter 126. Counter 126 is cleared after each card reading operation by the (0) output of the card present flip-flop 124. This flip-flop is reset by the output of delay 96 (FIGURE 3) after the card leaves the read station. The (0) output of the flip-flop 124 then goes high and is passed through an OR gate 130 to the clear (C) terminal of the counter.

Figure 6:
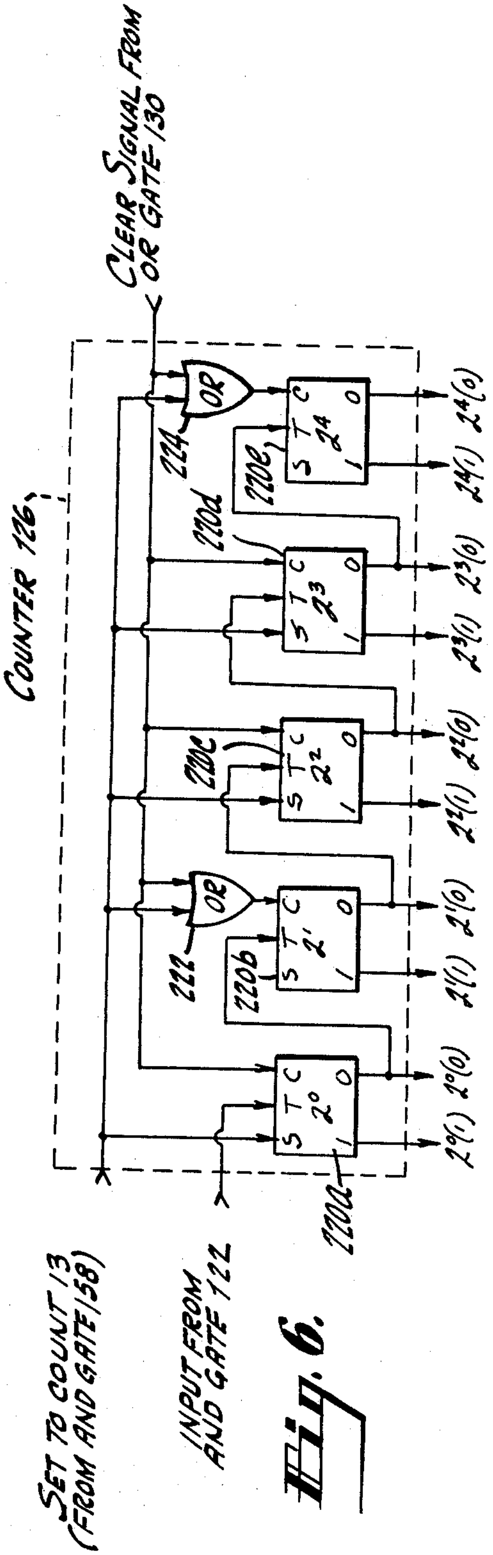
FIGURE 6 is a detailed logic diagram of the five stage counter.

As shown in detail in FIGURE 6, counter 126 may be a five stage binary counter comprising five triggerable flip-flops 220*a* . . . 220*e*. The first flip-flop 220*a* receives the timing pulses from AND gate 122 (FIGURE 4) at its trigger input terminal. The trigger input terminal of each of the other triggerable flip-flops is connected to the (0) output terminal of the next preceding flip-flop, whereby each of these flip-flops is triggered when the next preceding flip-flop is triggered from the set to the reset state.

Counter 126 is cleared by applying the output of OR gate 130 (FIGURE 4) to the CLEAR (C) input terminal of each of the triggerable flip-flops 220*a* . . . 220*e*. In the case of the second and fifth flip-flops 220*b* and 220*e*, the clear pulse is received by way of OR gates 222 and 224, respectively. In the operation of the control system, and as will be described in detail hereinafter, the counter 126 is selectively set to a count of 13 under certain operating conditions. This is accomplished by (a) applying a pulse at the set (S) input terminals of the first, third and fourth flip-flops 220*a*, 220*c* and 220*d*, and (b) applying a pulse at the CLEAR (C) input terminals of the second and fourth flip-flops 220*b* and 220*e* via OR gates 222 and 224. A common pulse for setting the counter to a count of 13 is derived from an AND gate 158 (FIGURE 4) under conditions to be described hereinafter.

Various portions of the system are operated under control of the counter 126. In particular, several different functions are performed for different counts stored in the counter. In order to derive control signals corresponding to these counts, the outputs of counter 126 are applied to a decoder 134 (FIGURE 4). This decoder is illustrated in detail in FIGURE 7 as comprising eight AND gates 230 . . . 244. Each of these AND gates receives a different combination of inputs from the outputs of the triggerable flip-flops 220*a* . . . 220*e* (FIGURE 6) in the counter 126. Consider AND gate 230 by way of example. This gate has its various inputs connected to the (1) output terminals of triggerable flip-flops 220*a*, 220*c*, 220*d*, and 220*e* and the (0) output terminal of second flip-flop 220*b*. Since a (1) output is high when a flip-flop is set and a (0) output is high when the flip-flop is reset, it may be seen that all of the inputs to AND gate 230 are high only when a count of 29 is stored in the counter. AND gate 230 then has a high output.

Each of the other decoder AND gates 232 . . . 244 receives a different set of four inputs from the counter flip-flops, and each such set of four inputs is derived from the first four flip-flops 220*a* . . . 220*d* to the exclusion of the fifth flip-flop 220*e*. Since a given state of the first four flip-flops can exist for two different counts, one count with the fifth flip-flop 220*e* set and a second count with the fifth flip-flop reset, it follows that each of the AND gates 232 . . . 244 is energized for two different count conditions. Also, these two counts differ by sixteen. Consider, for example, AND gate 232. This gate has its four inputs separately connected to the (0) output terminals of the first, third and fourth flip-flops 220*a*, 220*c* and 220*d*, and to the (1) output terminal of second flip-flop 220*b*. All of these inputs are high when a count of 2 is stored in the counter 126 (fifth flip-flop 220*e* in RESET state). These inputs also are high when a count of 18 is stored in the counter (flip-flop 220*e* in SET state). Thus, the output of AND gate 232 is high for either a count of 2 or a count of 18.

Figure 7:
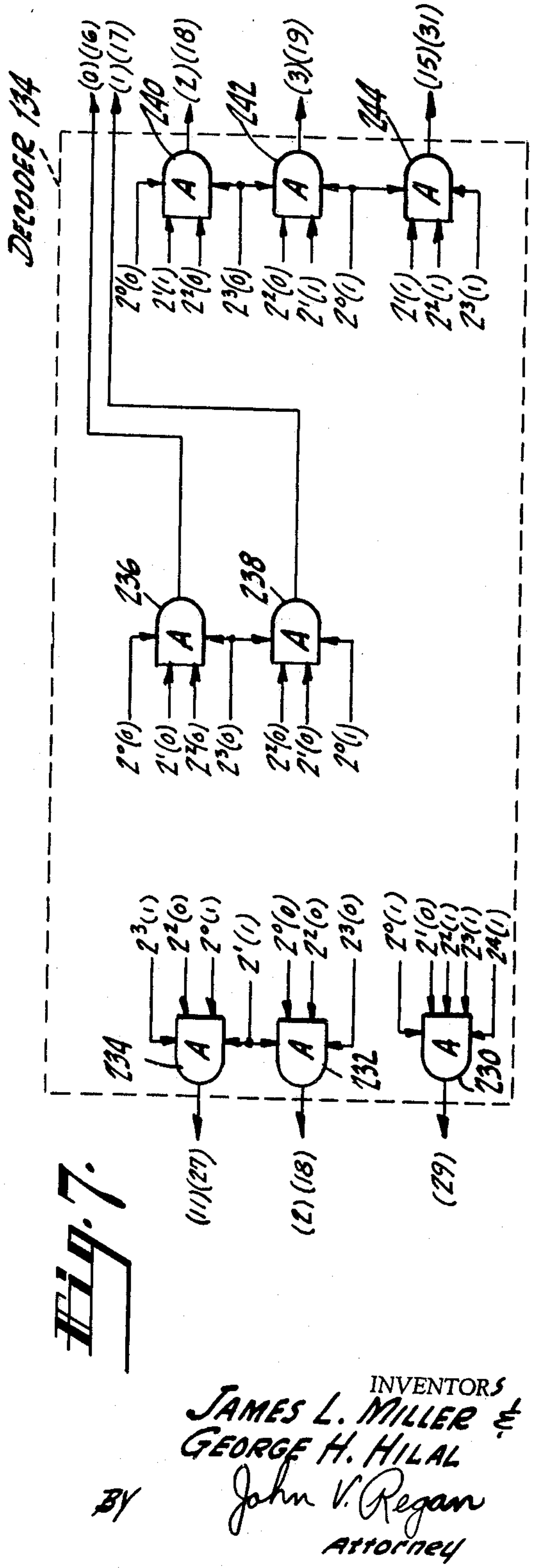
FIGURE 7 is a detailed logic diagram of the decoder.

By similar reasoning it can be shown that the output of each of the other AND gates 234 . . . 244 is energized for two different count conditions. In FIGURE 7, the count conditions(s) for which the output of an AND gate goes high are indicated in parentheses adjacent the output lead of that AND gate. The same notation is employed adjacent the output leads of the decoder 134 in FIGURE 4. For example, the signal on the decoder output line 136 (FIGURE 4) is high only when the counter 126 is storing a count of 29. This output sets a read flip-flop 138. The (1) output thereof goes high when the flip-flop is set, and a positive pulse is fed back through OR gate 130 to clear the counter 126 to zero. This pulse may be derived by differentiating the (1) output of the flip-flop 138 at the input to the OR gate 130. The (1) output also is applied to one input of a second AND gate 140 and to one input of a third AND gate 142. Gate 142 receives a second input from the decoder over line 144, and the voltage on this line is high whenever the counter is storing a count of either 15 or 31.

Second AND gate 140 also receives the "ALL DARK (N)" signal from the OR gate 102 of FIGURE 3, and the output of gate 140 is applied at the set input terminal of a presync flip-flop 146. Flip-flop 146 has its (1) output terminal connected to one input of a fourth AND gate 148 and has its (0) output terminal connected both to an input of a fifth AND gate 150 and to an input of the third AND gate 142. Gate 150 receives the timing pulses (TP) from the TP generator 120. These timing pulses are inverted and supplied as a second input to the fourth AND gate 148.

The output of AND gate 148 is applied to the trigger (T) input terminal of a three stage binary counter 154, and the output of fifth AND gate 150 is applied to the clear (C) terminal of the counter. The output of counter 154 sets a sync flip-flop 156 when a count of 4 is stored in the counter 154. Synch flip-flop 156 has its (0) output terminal fed back as one input to second AND gate 140. The (1) output terminal is (a) fed back to the reset input of presync flip-flop 146, (b) applied as one input to a sixth AND gate 158, and (c) applied as one input to a seventh AND gate 160. Each of the gates 158 and 160 also receives the "count of four" output from counter 1554. The "ALL DARK (N)" signal from the OR gate 102 (FIGURE 3) is applied as a third input to each of the AND gates 158 and 160. A fourth input terminal of seventh AND gate 160 is coupled to the (0) output terminal of a flip-flop 166, and the (1) output of this flip-flop is applied as a fourth input to the sixth AND gate 158. The output of gate 158 is applied to the five stage counter 126 and sets this counter to a reference count of 13 whenever sixth AND gate 158 is fully enabled.

Flip-flop 166 has its set input terminal connected at the output of an eighth AND gate 170. A first input of this gate is energized whenever the counter 126 stores a count of either 11 or 27. Flip-flop 166 has its reset input terminal connected at the output of a ninth AND gate 172. A first input to this gate is high whenever a count of either 2 or 18 is stored in the counter 126. A second input to both the eighth and ninth AND gates 170 and 172 is connected to the TP generator 120.

Third AND gate 142 has its output applied to the set input terminal of a flip-flop 180. The (1) output thereof is applied at one input of each of a set of AND gates 182, 184, 186, 188. Each of the latter gates has a second input connected to a different output of the decoder 134, and the second input is high when the counter 126 is storing either of the counts indicated adjacent the gate input lead. Tenth AND gate 182 has its output applied over a line 190 to the reset inputs of the register 90 in FIGURE 3. Eleventh AND gate 184 has its output applied over line 110 to the set of AND gates at the input of register 90. Twelfth AND gate 186 has its output applied over a line 108 to the processor (FIGURE 3).

The output of the thirteenth AND gate 188 is applied to the reset input of the flip-flop 180 and is also applied to the trigger terminal of a column counter 194. A second input to the column counter is the (0) output of the card present flip-flop 124, which resets the column counter after the trailing edge of a card leaves the read station. A high level appears on the counter 194 output lead when a count of 80 is reached (assuming eighty columns per card). This output is applied to a fourteenth AND gate 196, a second input of which is the "ALL DARK (P)" level from the inverter 106 (FIGURE 3). The output of fourteenth AND gate 196 is supplied to the reset input terminal of the read flip-flop 138 to reset this flip-flop at the end of a card read operation. The "ALL DARK (P)" signal also is applied to one input of a fifteenth AND gate 200, a second input of which is the (0) output of flip-flop 180. AND gate 200 has its output applied at the reset input terminal of the sync flip-flop 156.

It is the purpose of the timing system to control the transfer of information from the reading elements 80*a* . . . 80*n* (FIGURE 3) to register 90, to signal the processor 92 when read information is available, and to reset register 90 at the proper time in a read cycle. In addition, an important function of the arrangement is to resynchronize or rereference the timing each time a perforation-bearing card column is persented to the reading element 80*a* . . . 80*n*. The latter function, as will be described, is accomplished by setting counter 126 to a reference count when a perforation is sensed in a card column. By this means, spacing or timing tolerances between successive data bearing columns do not become cumulative to disrupt the operation of the reader system. On the other hand, the system operates to signal an error condition in the event that the spacing or timing between adjacent data bearing columns exceeds a certain predetermined tolerance.

The manner in which the system operates to perform these functions may best be understood by first establishing the relationship between the timing pulse frequency and certain dimensions of the card, and then considering the operation in terms of a few specific examples. In one conventional type of perforated record card, there are twelve rows and eighty columns of index point positions. The center lines of adjacent columns of index points are spaced a distance of 0.087″, and the width of a perforation may be about 0.055″. Thus, when perforations are properly punched in adjacent columns, the distance between the adjacent edges of perforations is 0.032″. A portion of the leading edge of a card with perforations properly located in columns 1 and 2 is illustrated in FIGURE 8(*a*) .

The apertures in timing disk 70 (FIGURE 2), which is part of the TP generator 120 (FIGURE 4), are spaced to generate 16 timing pulses as a card is moved a distance of 0.087″, corresponding to the spacing between centerlines of adjacent columns. For this reason, it is desired that counter 126 have a count capacity of 16 or a multiple thereof. Actually, a 32 bit counter 126 is provided in order to accommodate the large number of pulses generated during the large land area between the leading edge of the card and the first column. In addition, an imaginary column zero is assumed for timing convenience. The counter 126 reaches a count of 29 when the centerline $\Phi_0$ of imaginary column zero is presented to the reading elements.

Figure 8:
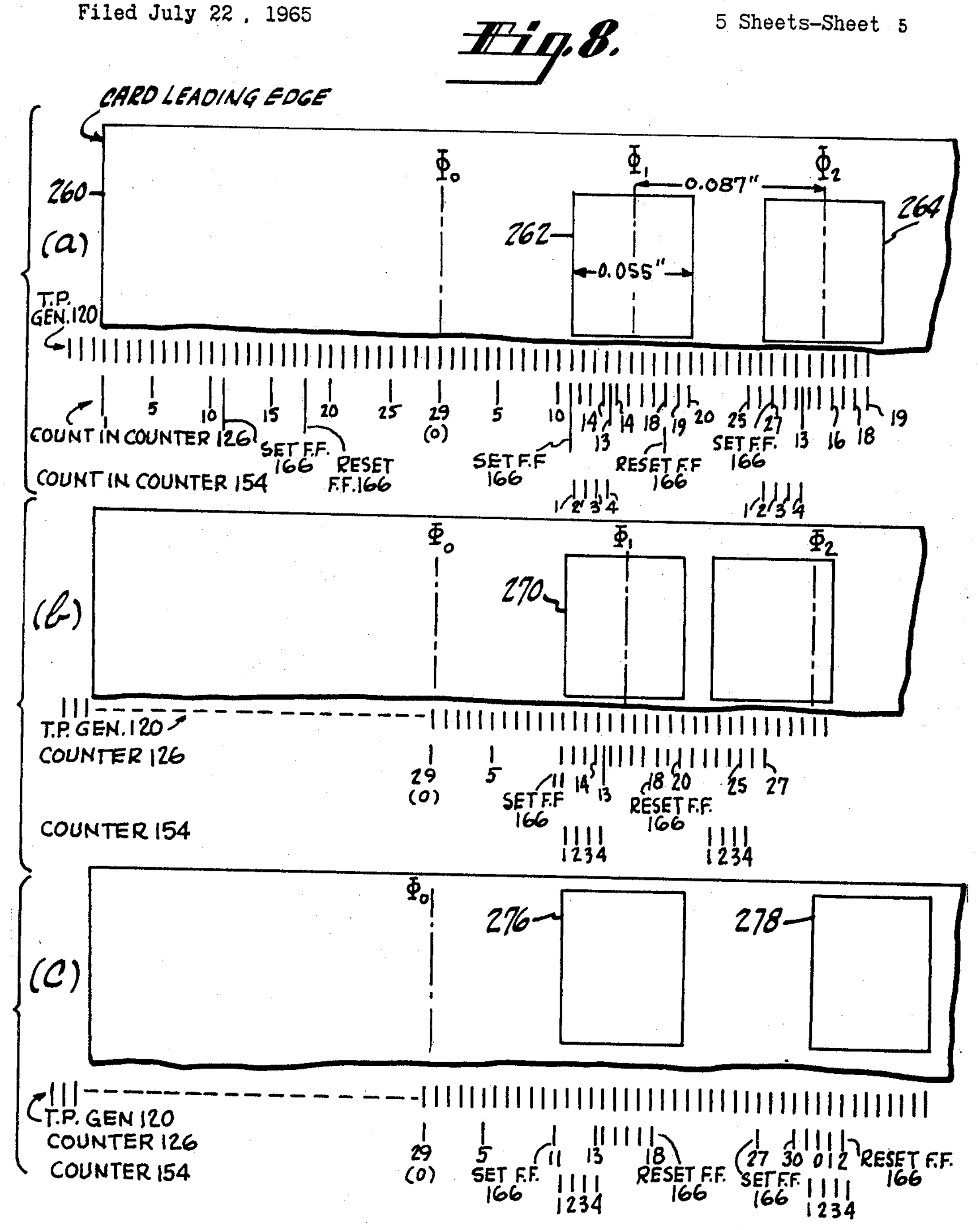
FIGURE 8 is a set of three record cards, in partial form, and illustrating the counts in the various counters as a function of card position in the reader.

With the aforementioned relationships in mind, consider the operation of the system when the properly perforated card 260 of FIGURE 8(*a*) is fed to the reader. Since card motion cannot be illustrated, timing pulses produced by TP generator 120 are shown, in the first row beneath the card, as essentially "moving" relative to the card. When the leading edge of the card is detected by photodetector 82 (FIGURE 3) the output of inverter 98 goes high. When the card reaches one of the reading elements 80*a* . . . 80*n*, the output of inverter 89 also goes high. AND gate 100 (FIGURE 3) then has a high output which sets the CP flip-flop 124 (FIGURE 4). The (1) output thereof goes high and primes one input to first AND gate 122, whereby succeeding timing pulses from generator 120 are passed to the trigger (T) input terminal of counter 126. Thus, for example, the first timing pulse following the card's leading edge triggers counter 126 to a count of one. The count stored in the counter is indicated in FIGURE 8(*a*) in the second row beneath the card. Flip-flop 166 becomes set at a count of 11 and reset at a count of 18. However, the state of this flip-flop has no effect on the operation of the system at this time because read flip-flop 138 does not become set until a count of 29 is reached. This will become apparent as the discussion proceeds.

As mentioned previously, counter 126 reaches a count of 29 when the centerline of imaginary column zero is presented to the reading elements. An output from decoder 134 (FIGURE 4), on line 136, then sets read flip-flop 138. The (1) output thereof goes high and clears the counter 126 to a count of zero via OR gate 30. Also, one input to each of second and third AND gates 140 and 142 become primed. Since no perforations are being detected by the reading elements at this time, the "ALL DARK (N)" level is low, and the output of second AND gate 140 remains low. Counter 126 continues to count timing pulses. When a count of 11 is reached, flip-flop is set via eighth AND gate 170 from decoder 134.

Almost coincidentally therewith, the leading edge of perforation 262 in column one is presented to the reading element 80*a* for row one. (Although the perforation is shown for convenience as being in the first row, it should be understood that the perforation could appear at the intersection of column one and any row. In fact, there could be more than one perforation in column one.) Amplifier 84*a* (FIGURE 3) then has a high output, and the output of OR gate 102 (FIGURE 3) goes high. The "ALL DARK (P)" level goes low; the "ALL DARK (N)" level goes high and fully enables second AND gate 140 (FIGURE 4), whereby the presync flip-flop 146 becomes set. Timing pulses from generator 120 are inverted and now pass through fourth AND gate 148 to the counter 154. That is to say, counter 154 is triggered following the termination of a timing pulse output from generator 120. The count stored in this counter is shown in the third row below the card 260 in FIGURE 8(*a*).

At the termination of the timing pulse that triggers counter 126 to a count of 14, the other counter 154 reaches a count of four. Sync flip-flop 156 becomes set and the (1) output thereof and the counter 154 output fully enable sixth AND gate 158. The high output of AND gate 158, which is a pulse, is fed back to counter 126 and sets this counter to a reference count of 13. Thus, the counter 126 and hence the timing are resynchronized in response to the sensing of data in column one. The (1) output of sync flip-flop 156 also resets presync flip-flop 146 to clear counter 154, and the (0) output blocks second AND gate 140 to prevent further triggering of this counter. The high (0) output of presync flip-flop 146 also primes a second input to third AND gate 142.

Counter 126 continues to count timing pulses. When a count of 15 is reached, third AND gate 142 becomes fully enabled and sets flip-flop 180. One input to each of the AND gates 182, 184, 186 and 188 is primed by the (1) output of this flip-flop. Tenth AND gate 182 is fully enabled at a count of 16 and resets register 90 (FIGURE 3) over the line 190. Eleventh AND gate 184 is fully enabled at a count of 17 and supplies a high input over line 110 to each of the AND gates 86*a* . . . 86*n* (FIGURE 3). Information being sensed by the reading elements 80*a* . . . 80*n* then is gated to the register 90. At a count of 18, twelfth AND gate 186 signals the processor 92 over line 108 to indicate that new information is available in register 90. At the same time, flip-flop 166 (FIGURE 4) is reset via ninth AND gate 172. However, the (0) output thereof has no effect since counter 154 is in the clear state and seventh AND gate 160 is thus blocked. When a count of 19 is reached by counter 126, thirteenth AND gate 188 is enabled, and the output thereof triggers column counter 194 and resets flip-flop 180. When the trailing edges of perforations in column one pass the respective sensing elements, the output of OR gate 102 (FIGURE 3) goes low, the "ALL DARK (P)" level goes high, and fifteenth AND gate (FIGURE 4) produces an output which resets the sync flip-flop 156.

Counter 126 continues to count timing pulses as the card is moved through the reading station. The leading edge of perforation 264 in column two reaches the sensing element 80*a* at about the time counter 126 is triggered to a count of 26. The output of OR gate 102 (FIGURE 3) then goes high and enables second AND gate 140 (FIGURE 4) to set the presync flip-flop 146. The inverted timing pulses then trigger counter 154 by way of fourth AND gate 148. Flip-flop 166 is again set when counter 126 reaches a count of 27. Following the trigger pulse which triggers counter 126 to a count of 29, counter 154 reaches a count of four. Sync flip-flop 156 becomes set, and sixth AND gate 158 produces a pulse which resets counter 126 to the reference count of 13. Thus, counter 126 and the timing for the system become resynchronized with the position of perforation 264 in column two. At a count of 15, third AND gate 142 becomes enabled and sets flip-flop 180. One input to each of the AND gates 182 . . . 188 then is primed. At a count of 16, AND gate 182 clears the register 90 (FIGURE 3) via line 190. At a count of 17, eleventh AND gate 184 gates the information from the reading elements 80*a* . . . 80*n* through AND gates 86*a* . . . 86*n* to the register 90. When the counter 126 reaches a count of 18, twelfth AND gate 186 signals the processor 92 that new information is available. AND gate 188 triggers the column counter 194 at a count of 19, and also resets flip-flop 180. When the trailing edge of the perforation 264 passes the associated reading element, the output of OR gate 102 (FIGURE 3) goes low, the "ALL DARK (P)" level goes high and fully enables fifteenth AND gate 200 to reset the sync flip-flop 156.

The aforementioned process is repeated each time a perforation bearing column is presented to the reading elements, and each time the timing is resynchronized with the position of the perforations. If no perforation is present in a column, presync flip-flop 146 does not become set, counter 154 remains cleared, and the counter 126 is not set to the reference count. However, counter 126 continues to count timing pulses. Since there are 16 pulses between column centerlines, and since counter 126 has a capacity which is a multiple of 16, the absence of a perforation in a column has no adverse effect on the timing. Even absent a perforation, flip-flop 180 becomes set in response to a count of either 15 or 31, the AND gates 182 . . . 188 become enabled in turn, the processor 92 is signaled, and the column counter 194 becomes triggered. Thus, column counter is triggered to a count of eighty after the last card column, and its output then resets the read flip-flop 138. When the trailing edge of the card passes the card sensing photodetector 82 (FIGURE 3), the output of amplifier 94 goes high, is delayed in device 96 and then resets the card-present flip-flop 124 (FIGURE 4). The (0) output thereof clears column counter 194, and resets the counter 126 via OR gate 130. Since the (1) output of this flip-flop 124 is now low, first AND gate 122 is disabled and no further timing pulses are applied to counter 126.

By resynchronizing the timing each time a perforation-bearing column is presented to the reading elements, the effects of slight slippage of the card do not become cumulative to interfere with the reading of information or to otherwise interfere with the operation of the system. In like manner, a slight skew of the card can be tolerated. Further, perforations which are only slightly off-center in the card columns do not interfere with the reading operation. However, if the spacing between adjacent perforation-bearing columns is off by more than a certain predetermined tolerance, or if the slippage of the card is greater than a certain predetermined amount, the card will be rejected in response to an error condition signaled by the system in a manner which will now be described.

In FIGURE 8(*b*), a portion of a record card is illustrated in which the perforation 270 in column one is properly located, but wherein the perforation 272 in column two is off-set in the direction of column one. Since the perforation 270 in column one is properly located, the operation of the system in response to the detection of this perforation is the same as that described hereinabove in connection with FIGURE 8(*a*), and will not be repeated. It should be noted that flip-flop 166 becomes reset via ninth AND gate 172, during the passage of perforation 270 past the reading elements, when the counter 126 reaches a count of 18.

Counter 126 continues to count timing pulses as the card moves through the reading station. The leading edge of the perforation 272 in column two reaches the appropriate one of the sensing elements shortly after counter 126 is triggered to a count of 22. OR gate 102 (FIGURE 3) then produces a high output level which fully enables second AND gate 140 (FIGURE 4) to set the presync flip-flop 146. Inverted timing pulses then pass through the fourth AND gate 148 and trigger counter 154. Counter 154 reaches a count of four after counter 126 is triggered to a count of 25. Flip-flop 166 is still in the reset state at this time, since counter 126 has not reached a count of 27. Accordingly, when counter 154 reaches a count of four, sync flip-flop 156 becomes set, and the (1) output thereof and the output of counter 154 fully enable seventh AND gate 160, and an error signal is generated by this gate.

Because flip-flop 166 is not in the set state at this time, sixth AND gate 158 does not become enabled, and counter 126 is not set to the reference count of 13. Insofar as the remainder of the system is concerned, the various AND gates, flip-flops, etc., are operated under control of the counter 126 in the manner previously described, just as though no perforation had been sensed in column two. The error signal, however, may be applied to other circuitry (not shown) to cause a rejection of the card, and could also be fed to the processor to signal the processor to the information from the card.

Whether or not an error condition is signaled depends upon whether flip-flop 166 is in the reset state or the set state, respectively, when counter 154 reaches a count of four. In turn, whether or not flip-flop 166 is in the set state or the reset state depends upon the count in counter 126 and the counter outputs which are selected for setting and resetting the flip-flop 166. Thus, the system tolerance can be preselected by properly choosing the counter 126 outputs for setting and resetting the flip-flop 166. The counts which are selected also depend upon the output of three stage counter 154 which is selected for setting the sync flip-flop 156 and priming sixth and seventh AND gates 158 and 160. For example, the three stage counter 154 could be eliminated from the system, which would necessitate a downward change of four counts in the counter outputs selected for gates 170 and 172. Counter 154 is included in the system, however, to require that any perforation in the card be wide enough to allow the generation of four timing pulses during its presence in the reader. In this manner, slight pin holes or the like are recognized and rejected as not being data representing perforations.

In FIGURE 8(*c*) a portion of a record card is shown which has a properly located perforation 276 in column one and an improperly located perforation 276 in column two, the latter perforation being off-set toward column 3. Since the first perforation 276 is properly locate, the response of the system to this timing pulse is similar to that of the perforation 262 in FIGURE 8(*a*), which was described previously, and hence will not be repeated. It will be noted in FIGURE 8(*c*) that the counter 126 reaches a count of 27 during the gap between perforations 276 and 278. Flip-flop 166 then becomes set. The leading edge of the perforation 278 is detected at about the time that counter 126 is triggered to a count of 31. OR gate 102 (FIGURE 3) then has a high output, and second AND gate 140 (FIGURE 4) becomes fully enabled to set the presync flip-flop 146. However, before counter 154 reaches a count of four, the main counter 126 reaches a count of two, and flip-flop 166 becomes reset via ninth AND gate 172. Therefore, when counter 154 reaches a count of four, sync flip-flop 156 becomes set, and the (1) output thereof and the output of counter 154 fully enable seventh AND gate 160, and the error condition is generated.

In summary, the timing system described and illustrated performs several important functions. The system controls the resetting of register 90, the gating of information from the sensing elements 80*a* . . . 80*n* to the register 90, and the signaling of the processor 92 when new information is available. Further, the system timing is resynchronized, or restarted from a reference condition, each time a data perforation is sensed in any column, whereby system and card tolerances do not become cumulative, and slight slippage and card skew are tolerated. Also, the timing system allows for tolerances within predetermined limits, which can be preselected, and produces an error signal to reject any card in which the tolerances are greater than the predetermined limits. Stated in another way, the timing system is so arranged that an error condition is signaled if a perforation-bearing column does not arrive at the reading station within a specified time limit following the arrival of the last preceding perforation-bearing column at the card reader.

What is claimed is:

1. The combination comprising:
a reader for a document having a line of data storage positions;
means for feeding said document to said reader in a direction to present said data storage positions seriatim to said reader;
a source of timing signals;
a counter coupled to receive said timing signals;
data receiving means;
means responsive to a particular count in said counter for gating the output of said reader to said data receiving means; and
means responsive to the sensing of data by said reader when the count in said counter is within a specified range of counts for setting said counter to a reference count.

2. The combination comprising:
a reader for a document having a line of data storage positions;
means for feeding said document to said reader in a direction to present said data storage positions seriatim to said reader;
a source of timing signals;
a counter coupled at the output of said reader;
gate means coupled at the output of said reader;
means responsive to a particular count in said counter for applying a gating signal to said gate means;
means responsive to the occurrence of an output from said reader when the count in said counter is within a specified range of counts for setting said counter to a reference count; and
means responsive to the occurence of an output from said reader when the count in said counter is outside said range of counts for signaling an eror conditions.

3. The combination comprising:
a reader for documents having plural lines of data storage positions at which data may be recorded;
means for feeding a document to said reader in a direction generally transverse to said lines;
a source of timing signals;
a counter coupled to receive said timing signals;
output means coupled at the outputs of said reader;
means responsive to at least one particular count in said counter for controlling the operation of said output means;
means responsive to an output said reader for producing a control signal; and
means responsive to the occurrence of said control signal when the count in said counter is within a specified range of counts for setting said counter to a reference count.

4. The combination comprising:
a reader for documents having plural lines of data storage positions at which data may be recorded;

means for feeding a document to said reader in a direaction generally transverse to said lines;
a source of timing signals;
a counter coupled to receive said timing signals;
output means coupled to receive the outputs of said reader;
means responsive to at least one particular count in said counter for controlling the operation of said output means;
means responsive to an output from said reader for producing a control signal;
means responsive to the occurrence of a said control signal when the count in said counter is within a specified range of counts for setting said counter to a reference count; and
means responsive to the occurrence of said control signal when the count in said counter is outside said specified range of counts for signaling an error condition.

5. The combination comprising:
a reader for documents having plural lines of data storage positions at which data may be recorded;
means for feeding a document to said reader in a direction generally transverse to said lines;
a source of timing signals operated in synchronism with said feeding means;
a counter coupled to receive said timing signals;
output means coupled to receive the outputs from said reader;
means responsive to at least one particular count in said counter for controlling the operation of said output means;
means responsive to an output from said reader which is of at least given minimum duration for generating a control pulse;
means responsive to the occurrence of said control pluse when the count in said counter is within a specified range of counts for setting said counter to a reference count; and
means responsive to a said control pulse occurring when the count in said counter is outside said specified range for signaling an error condition.

6. The combination comprising:
a reader for documents having plural lines of data storage positions at which data may be recorded;
means for feeding a document to said reader in a direction generally transverse to said lines;
a source of timing signals operated in synchronism with said feeding means;
a counter;
means for feeding said timing pulses to said counter when a document is present at said reader;
output means coupled to receive the outputs from said reader;
means responsive to a particular count in said counter for controlling the operation of said output means;
a bistable device having a set state and a reset state;
means responsive to a first given count in said counter for setting said bistable device;
means responsive to a second, other given count in said counter for resetting said bistable device;
means responsive to the occurrence of a data output signal from said reader when said bistable device is in a first one of the reset and set states for setting said counter to a reference state; and
means responsive to the occurrence of a data output signal when said bistable device is in the other one of the set and reset states for signaling an error condition.

7. The combination comprising:
a reader for documents having plural lines of data storage positions at which data may be recorded;
means for feeding a document to said reader in a direction generally normal to said lines;

a source of timing signals operated in synchronism with said feeding means;
a counter;
means responsive to the absence of a document in said reader for setting said counter to a first reference count;
means responsive to the presence of a document in said reader for coupling the timing pulses to said counter;
data receiving means;
means responsive to a particular count in said counter for gating the outputs of said reader to said data receiving means;
a bistable device having a set state and a reset state;
means responsive to a first given count in said counter for setting said bistable device;
means responsive to a second, other given count in said counter for resetting said bistable device;
means responsive to an output signal from said reader for generating a delayed control pulse;
means responsive to a said delayed pulse and an output from said reader coexisting when said bistable device is in a first one of the set and reset states for setting said counter to a second reference count; and means responsive to a said control pulse and an output from said reader coexisting when said bistable device is in the other one of said set and reset states for signaling an error condition.

8. The combination comprising:
a document reader;
means for feeding a document to said reader;
a source of timing signals;
a counter coupled to receive and count said timing signals in a prescribed counting sequence;
means responsive to a particular count in said counter for gating the output of said document reader; and
means responsive to an output from said reader occurring during a particular portion of said counting sequence for changing the count stored in said counter to a different count.

References Cited

UNITED STATES PATENTS

| | | | |
|---|---|---|---|
| 3,076,599 | 2/1963 | Smith ____________ | 235—61.11 |
| 3,173,000 | 3/1965 | Johnson et al. _____ | 235—61.11 |
| 3,229,073 | 1/1966 | Macker et al. ______ | 235—61.11 |

DARYL W. COOK, Primary Examiner

UNITED STATES PATENT OFFICE

CERTIFICATE OF CORRECTION

Patent No. 3,493,729 Dated February 3, 1970

Inventor(s) George H. Hilal etal.

It is certified that error appears in the above-identified patent and that said Letters Patent are hereby corrected as shown below:

Col. 11, line 44, "at the output of said reader;" should be ---to receive said timing signals;---.

Col. 11, line 54, "eror" should be ---error---.

Col. 11, line 55, "conditions" should be ---condition---.

SIGNED AND SEALED
SEP 22 1970

(SEAL)
Attest:

Edward M. Fletcher, Jr.
Attesting Officer

WILLIAM E. SCHUYLER, JR.
Commissioner of Patents